US012631055B2

(12) United States Patent
Schubert et al.

(10) Patent No.: US 12,631,055 B2
(45) Date of Patent: May 19, 2026

(54) LOCKING MEANS FOR A FRONT FLAP OF A MOTOR VEHICLE

(71) Applicant: AUDI AG, Ingolstadt (DE)

(72) Inventors: Andre Schubert, Wellheim (DE); Thomas Liepold, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 258 days.

(21) Appl. No.: 18/604,830

(22) Filed: Mar. 14, 2024

(65) Prior Publication Data

US 2024/0318475 A1 Sep. 26, 2024

(30) Foreign Application Priority Data

Mar. 20, 2023 (DE) ..................... 10 2023 106 832.6

(51) Int. Cl.
*E05B 81/04* (2014.01)
*E05B 81/16* (2014.01)
(Continued)

(52) U.S. Cl.
CPC .............. *E05B 81/16* (2013.01); *E05B 81/04* (2013.01); *E05B 81/20* (2013.01); *E05B 81/32* (2013.01);
(Continued)

(58) Field of Classification Search
CPC .......... E05B 81/16; E05B 81/04; E05B 81/20; E05B 81/32; E05B 81/50; E05B 81/68;
(Continued)

(56) References Cited

U.S. PATENT DOCUMENTS 4,691,584 A 9/1987 Takaishi et al.
4,702,117 A 10/1987 Tsutsumi et al.
(Continued)

FOREIGN PATENT DOCUMENTS

DE 10 2008 034 770 B4 11/2012
DE 10 2014 118 635 A1 4/2016
(Continued)

OTHER PUBLICATIONS

German Office Action dated Nov. 9, 2023 for German Applcation No. 10 2023 106 832.6.

*Primary Examiner* — Kristina R Fulton
*Assistant Examiner* — Thomas L Neubauer
(74) *Attorney, Agent, or Firm* — STAAS & HALSEY LLP

(57) ABSTRACT

A locking apparatus for a front flap of a motor vehicle comprises a double-stroke lock, including a first locking element and a second locking element, to mechanically lock the front flap in a closed position and in a locked position; an unlocking element, coupled to the double-stroke lock, to unlock the first locking element by a first stroke and the second locking element by a second stroke separate from the first stroke; an actuator, coupled to the unlocking element, to move the unlocking element to unlock the first locking and the second locking element; a drive motor to drive the actuator; a first control device and a second control device to separately control the drive motor; and a changeover element to change over control of the actuator from the first control device to the second control device and vice versa based on a position of the actuator. The drive motor is operable by the first control device to move the actuator to effect a first stroke, and the drive motor is operable by the second control device to move the actuator to effect a second stroke.

20 Claims, 5 Drawing Sheets

(51) Int. Cl.

| | |
|---|---|
| ***E05B 81/20*** | (2014.01) |
| ***E05B 81/32*** | (2014.01) |
| ***E05B 81/50*** | (2014.01) |
| ***E05B 81/68*** | (2014.01) |
| ***E05B 83/16*** | (2014.01) |

(52) U.S. Cl.
CPC .............. *E05B 81/50* (2013.01); *E05B 81/68* (2013.01); *E05B 83/16* (2013.01)

(58) Field of Classification Search
CPC .......... E05B 83/16; E05B 79/20; E05B 81/06; E05B 81/18; E05B 83/24; E05B 81/56; E05B 81/64; E05B 77/00; E05B 85/00
See application file for complete search history.

(56) References Cited

U.S. PATENT DOCUMENTS

| | | | | |
|---|---|---|---|---|
| 10,604,975 | B2 * | 3/2020 | Hunt | E05C 3/12 |
| 2002/0000726 | A1 * | 1/2002 | Zintler | E05B 81/08 292/216 |
| 2020/0318400 | A1 * | 10/2020 | Johann | E05B 81/14 |
| 2021/0207410 | A1 * | 7/2021 | Oyama | E05B 83/247 |
| 2023/0220713 | A1 * | 7/2023 | Lebsak | E05F 1/002 |

FOREIGN PATENT DOCUMENTS

| | | | |
|---|---|---|---|
| DE | 10 2018 124 122 | A1 | 4/2020 |
| DE | 10 2019 130 528 | A1 | 5/2021 |
| DE | 10 2020 108 310 | A1 | 9/2021 |
| DE | 10 2021 102 552 | A1 | 8/2022 |
| DE | 10 2021 122 830 | A1 | 3/2023 |
| DE | 10 2023 106 832.6 | | 3/2023 |

* cited by examiner

LOCKING MEANS FOR A FRONT FLAP OF A MOTOR VEHICLE

CROSS REFERENCE TO RELATED APPLICATIONS

This application is based on and claims priority under 35 U.S.C. § 119 to German Application No. 10 2023 106 832.6, filed on Mar. 20, 2023, the disclosure of which is incorporated by reference herein in its entirety.

BACKGROUND

Disclosed herein is a locking means (or locking apparatus) for a front flap (for example, a hood or a front trunk) of a motor vehicle, comprising a double-stroke lock that has a first and a second locking element for mechanically locking the front flap in a closed position.

The front flap of a motor vehicle is secured twice for safety reasons. In the actual closed position, the front flap is fully locked by a double-stroke lock. To unlock, a first locking element of the double-stroke lock, e.g. a pawl, must be actuated a first time, such that the front flap can be opened slightly and is secured in a pre-latched position by a second locking element, e.g. a catch hook. This pre-latched position ensures that the front flap, when the front flap has accidentally not been fully closed beforehand, cannot swing open when the vehicle is moving. To open the front flap completely, the locking element must be actuated a second time in order to release also the catch hook, such that the secured pre-latched position is also released. This double actuation is realized by a double-stroke lock.

Electrical positioning means are increasingly being used to perform mechanical positioning tasks. In the case of actuation of a double-stroke lock, since two separate lockings have to be released, two separate electrical positioning means, i.e. corresponding drive motors, must also be used in order to release, on the one hand, the locking in the locked position and, on the other hand, the locking in the pre-latched position. It would be expedient if only one positioning means were required to perform the separate unlocking operations. However, this requires a corresponding safety architecture, as it is necessary to avoid both locking stages being inadvertently unlocked by an incorrect or erroneous double actuation of the positioning means. It is conceivable to provide a separate control device for each unlocking stage, with one control device controlling the unlocking of the locked position and the other control device controlling the unlocking of the pre-latched position. Nevertheless, there is the problem that when the control device controlling the locked position accidentally operates a double actuation of the positioning means, the locking mechanism is inadvertently opened completely despite the safety architecture provided in respect of the control devices.

SUMMARY

Disclosed herein is a locking apparatus for a front flap (e.g., a hood or a front trunk) of a motor vehicle. The locking apparatus for the front flap of the motor vehicle comprises a double-stroke lock that has a first locking element and a second locking element for mechanically locking the front flap in a closed position, which locking element can be unlocked by two separate strokes of an unlocking element, an actuator, coupled to the unlocking element, for moving the unlocking element for the purpose of unlocking the locking elements, a drive motor driving the actuator, a first control device and a second control device for separately controlling the drive motor, and a changeover element for changing over from the first control device to the second control device and vice versa, the drive motor being operable by the first control device for the purpose of moving the actuator to effect a first stroke, and the drive motor being operable by the second control device for the purpose of moving the actuator to effect a second stroke, the changeover element being controllable in dependence on the position of the actuator for the purpose of changing over.

The locking apparatus according to an example of the invention has, on the one hand, two separate control devices as a safety architecture, the first control device serving to effect the unlocking of the locked position by unlocking the first locking element, while the second control device serves to effect the unlocking of the pre-latched position by unlocking the second locking element. Both the first control device and the second control device control a common drive motor, which in turn drives an actuator, which in turn is coupled to an unlocking element by which the double-stroke lock can be actuated to unlock the two locking elements.

An element of the locking apparatus in this case is a changeover element, which serves to switch from the first control device to the second control device and vice versa, to ensure that only one control device is integrated into the actual control path at any one time. The changeover element in this case can be controlled in dependence on the position of the actuator for the purpose of changing over, i.e. a changeover from the first to the second control device and vice versa is dependent on the position of the actuator. The first control device in this case controls the drive motor for the purpose of moving the actuator to effect a first stroke, by which the first locking element, for example the pawl, is actuated, or unlocked, i.e. the locked position is unlocked such that the front flap moves into the pre-latched position. The second control device controls the drive motor for the purpose of moving the actuator to effect a second stroke, by which the second locking element is then actuated, or unlocked, such that the pre-latched position is unlocked by releasing of the second locking element, e.g. the catch hook. In an aspect of the present invention, the unlocking of the locked position is thus controlled exclusively by the first control device. When the locking has been released, the changeover element, on the basis of the position of the actuator that results from the unlocking, effects a changeover from the first control device to the second control device, such that only the latter can control a subsequent step. The first control device can consequently only control the unlocking of the locked position, i.e. only the first stroke, since the first control device is switched out of the control path immediately after the first stroke is performed. Any incorrect control by the first control device that would result in unlocking of the pre-latched position also is therefore precluded; this unlocking can only be controlled, for example, by the second control device.

The locking apparatus according to an aspect of the invention thus has an optimum safety architecture that prevents an inadvertent double actuation of the actuator, and thus an inadvertent execution of a double stroke, resulting from a control error.

For this purpose the drive motor may be controllable by the first control device for the purpose of moving the actuator from a neutral position, in a first direction, to effect the first stroke, as far as a first changeover position in which the changeover element can be actuated by the actuator to change over from the first control device to the second control device, whereupon the actuator can be restored to the neutral position, whereupon the drive motor controllable is by the second control device for the purpose of moving the actuator from the neutral position, in the first direction, to effect the second stroke, whereupon the drive motor can be restored to the neutral position. Once the actuator is moved from the neutral position into the changeover position as a result of control by the first control device, the first stroke is effected. At the same time as the changeover position is reached, switching is effected from the first control device to the second control device. The first control device is thus taken out of the control path and any control signal transmitted by the first control device would inevitably be ignored. Instead, the second control device is integrated into the control path. After the actuator has been restored to the neutral position, the second control device can operate the drive motor once again to effect a movement of the actuator from the neutral position, again in the first direction, to effect the second stroke. At the end of this control movement the actuator is again restored to the neutral position. The two strokes are thus effected by two separate movements of the actuator, each in the same first direction, the first movement being effected exclusively by the first control device, because the first control device is switched into the control path, while the second movement can be effected exclusively by the second control device, because the second control device is then switched into the control path.

Following unlocking of the pre-latched position, the changeover element effects switching, as described, to the second control device. As described above, however, the latter is not able to control the first stroke. In an aspect of the invention, this is only possible by the first control device. In order to now switch back to the first control device, an aspect of the invention provides that the drive motor can be controlled by the second control device to move the actuator from the neutral position, in a second direction, into a second changeover position in which the changeover element can be actuated by the actuator to change over from the second control device to the first control device, whereupon which the actuator can be restored to the neutral position. This second changeover operation, by which switching back is effected virtually back to the initial switching position in which the first control device is switched into the control path, is also effected solely in dependence on the position of the actuator. The second control device is integrated into the control path at the end of the second stroke, i.e. when the front flap is completely unlocked. The second control device is configured by its programming in such a way that, after the second stroke has been performed, the second control device operates the drive motor accordingly in order to move the actuator in a second direction, opposite to the first direction, and to bring the actuator into a second changeover position in which switching back from the second control device to the first control device is effected, i.e. the second control device is removed from the control path again and the first control device is reintegrated into the control path. In this way, the switching back operation can be controlled in a simple manner and again controlled solely through the position of the actuator, and the initial situation can be resumed.

Another aspect of the invention provides that the double-stroke lock can be actuated by a pull-shut element coupled to the actuator for the purpose of pulling the front flap shut. Therefore, not only the unlocking is effected fully automatically, but also the final pulling-shut of the front flap into the locked position. Provided for this purpose is a pull-shut element, which is coupled to the actuator and by which the double-stroke lock can be actuated in order to pull the front flap into the final locked position when the front flap is moved manually or automatically from the open position and past the pre-latched position in order to close it. The actuator is thus a multifunctional positioning element that is actuated both for unlocking and for pulling shut into the final locked position.

In another aspect of the invention, the pull-shut element can be actuated during the movement of the actuator in the second direction. As described, this actuator movement is controlled by the second control device in order to switch back from the second control device back to the first control device. This actuator movement is simultaneously used as an actuation movement for the pull-shut element, and thus for automatically pulling shut the front flap into the final locked position. Thus, while the movement of the actuator in the first direction serves to unlock the first and second locking elements, the movement of the actuator in the second direction serves to pull shut the front flap until the front flap is locked by the first locking element.

Both the changing-over and the corresponding actuation of the double-stroke lock are effected, as described, based on a movement of the actuator. The latter can be moved at least in a first direction, but preferably also in a second direction when an automatic pull-shut function is realized. This movement of the actuator may be realized with different actuator types. According to a first variant, the actuator may be a rotary actuator that can be rotated by the drive motor. Thus, when the drive motor is operated by the first or second control device, the motor rotates the rotary actuator about a corresponding axis of rotation, possibly by an interposed transmission. Alternatively, it is also conceivable for the actuator to be a linear actuator that can be moved linearly by the drive motor. In the case of this variant, the actuator thus executes a linear movement when the actuator is moved in the first direction and possibly also in the second direction. Both the rotary movement and the linear movement can easily be sensed accordingly in order to determine with precision when the respective changeover position is reached.

As described, the changeover from the first control device to the second control device and vice versa is effected in dependence on the position of the actuator when the changeover position is reached. This changeover may be effected either mechanically or contactlessly. For the purpose of sensing the position, two position elements that can be brought to be operatively connected to the changeover element, depending on the direction of movement of the actuator, may be provided on the actuator. These position elements are designed differently depending on whether mechanical or contactless position sensing is effected When mechanical position sensing is effected, the position elements may be driver elements that can be brought mechanically to be operatively connected to the changeover element. For example, the actuator is provided with two projections that protrude from the actuator and form the driver elements. Depending on the direction of rotary or linear movement, one or other of the driver elements runs against the changeover element and actuates the changeover element to change over from the first to the second control device and vice versa When contactless position sensing is effected, the position elements may be elements that can be sensed optically or electromagnetically, the position of which can be sensed by a sensing the changeover element. For example, corresponding position elements in the form of suitable markings that can be sensed photo-optically are provided on the actuator. A corresponding optical sensor system on the changeover element senses such a position element when the changeover position is reached, thereby indicating the changeover operation. As an alternative to optical sensing, electromagnetic sensing is also conceivable. In this case, for example, the position elements are in the form of metal elements that allow capacitive position sensing by a suitable sensor system on the changeover element when the respective changeover position is reached.

In a further aspect of the invention when a stop element is provided on the actuator, in which case there is provided at least one stop that is fixed in position, by which the movement of the actuator into the first changeover position is delimited. When necessary, a second stop, fixed in position, may also be provided, by which the movement of the actuator into the second changeover position is delimited. This stop function defines the respective changeover position and ensures that the corresponding changeover position is assumed in a defined manner at the end of the actuator movement and is also sensed.

As described, unlocking is effected by a double actuation of the double-stroke lock by the actuator and the unlocking element. In order to effect the first and second stroke, a Bowden cable is preferably provided as the unlocking element. This Bowden cable converts the rotary or linear movement of the actuator into a corresponding pulling movement, by which the respective stroke for actuation of the double-stroke lock to release the pawl in the first stroke, or the catch hook in the second stroke, is effected. A force sufficient for actuation can easily be effected by such a Bowden cable.

As described, unlocking is effected by double actuation of the double-stroke lock via the actuator and the unlocking element. To achieve the first and second stroke, a Bowden cable is preferably provided as the unlocking element. The rotary or linear movement of the actuator is converted into a corresponding pulling movement via this Bowden cable, via which the respective stroke for actuation of the double-stroke lock to release the pawl in the first stroke or the catch hook in the second stroke is achieved. A sufficiently high force for actuation can be easily achieved via such a Bowden cable.

In the same way, the pull-shut element, when one is provided, may also be in the form of Bowden cable. To pull shut, a force of appropriate magnitude must also be transmitted to the double-stroke lock so that the double-stroke lock can pull the front flap into the locked position with appropriate firmness and against the restoring force of any sealing elements and the like.

As described in the introduction, the actuator is in each case reset to the neutral position after a movement in the first and second direction. This restoration may be effected in different ways. It is conceivable for this restoration from the first and/or second changeover position to the neutral position to be effected by a spring element. In the case of a rotary actuator, such a spring element is, for example, a spiral spring. The spiral spring is compressed during a movement in the first direction, but is extended during a movement in the second direction. In either case, during each movement a restoring force is generated, which turns the rotary actuator back to the neutral position. In the case of a linear actuator, a coil spring is used, for example, as the spring element, although in this case two coil springs may also be used, with one resetting from the first direction and the other from the second direction.

As an alternative to the use of such mechanical restoring elements, it is also conceivable that the actuator can be returned from the first and/or the second changeover position to the neutral position, by the control device switched-in when the respective changeover position is reached, by operation of the drive motor. The first and the second control device are therefore programmed accordingly so that they can operate the corresponding restoring movement of the actuator, by operation of the drive motor, after the respective positioning movement in the first or second direction has been performed.

In addition to the locking apparatus, the invention also relates to a motor vehicle comprising both a front flap and a locking apparatus of the type described above.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
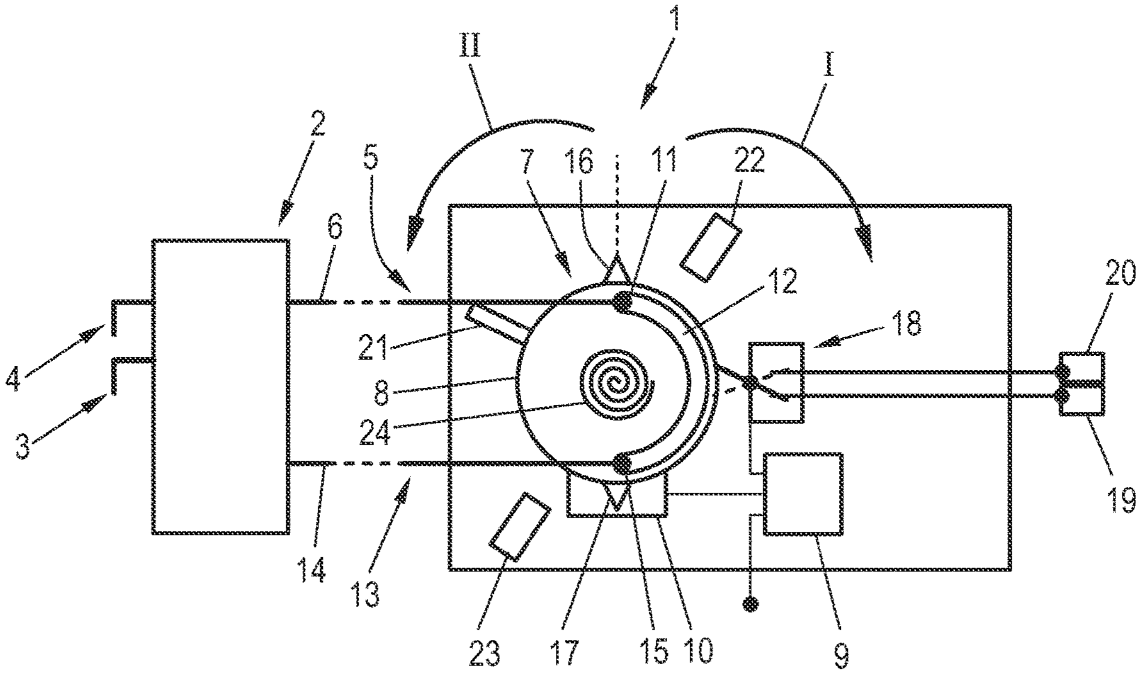
FIGS. 1-9: show various schematic representations of a locking apparatus according to examples of the invention in examples of different operating positions.

Reference will now be made in detail to the preferred embodiments, examples of which are illustrated in the accompanying drawings, wherein like reference numerals refer to like elements throughout.

FIG. 1 shows a schematic representation of an example of a locking apparatus 1 according to the invention. The locking apparatus 1 serves to lock and unlock a front flap (such as a hood or a front trunk) of a motor vehicle. The locking apparatus 1 comprises a double-stroke lock 2, having a first locking element 3 that serves to lock the front flap in the final locked position. The first locking element 3 may be, for example, a pawl or similar. Also provided is a second locking element 4 that serves to hold the front flap in a pre-latched position. When the first locking element 3 is locked, the front flap can be opened slightly in a manner known per se, but not completely, so that the front flap is prevented from opening when the first locking element is unlocked inadvertently. This securing is realized by the second locking element 4, for example a catch hook, which fixes the front flap in the pre-latched position.

The double-stroke lock 2 is a mechanical lock that, by two separate, successive strokes, enables the first locking element 3 to be unlocked first with a first stroke, and then the second locking element 4 to be unlocked with a second stroke. The basic structure and function of such a double-stroke lock 2 is known. In order to unlock the locking elements 3, 4, an unlocking element 5 is provided in the form of a Bowden cable 6, which can be actuated by an actuator 7 to effect the individual strokes. The actuator 7 is a rotary actuator 8 that can be rotated about an axis of rotation, this rotation being effected by a drive motor 9. There is a transmission 10 connected between the drive motor 9 and the rotary actuator 8. To actuate the Bowden cable, i.e. to pull the pull-cable to effect the respective stroke, the Bowden cable 6 is accommodated with a retaining nipple 11 in what is here an arcuate groove 12 of the rotary actuator 8.

Also provided is pull-shut element 13, which is also in the form of a Bowden cable 14. This pull-shut element 13 serves to automatically pull the front flap into the final closed position when the front flap is to be brought from the open position into the closed position, and then to lock the front flap, such that ultimately no manual action is required for this. This Bowden cable 14 is also mounted in the arcuate groove 12 by a retaining nipple 15, but is located at the other end of the groove 12, as shown in FIG. 1.

The rotary actuator 8 furthermore has a first position element 16 in the form of a radially protruding projection, and a second position element 17, likewise in the form of a radially protruding projection, the two being diametrically opposite each other. These two position elements 16, 17 serve to actuate a changeover element 18 (or changeover apparatus 18), by which either a first control device 19 or a second control device 20 can be switched into the control path for the purpose of controlling the drive motor 9. The changeover element 18 in this case is configured in such a way that only one of the two control devices 19, 20 is switched-in to the control path at any one time, while the other is switched out of the control path.

Also provided on the rotary actuator 8 is a stop element 21, again protruding radially, to which are assigned the stops 22, 23, which are fixed in position and delimit the rotational movement of the rotary actuator 8 in a first direction I (clockwise) and a second direction II (anti-clockwise). The respective rotation delimitation coincides with the respective actuation of the changeover element 18, by the first or second position elements 16, 17, in the respective direction of rotation.

FIG. 1 shows an example of the locking apparatus 1 in the initial position, in which the actuator 7 is located in a neutral position. The front flap is fully controlled, i.e. fixed in the final closed position by the first locking element 3. The changeover element 18 is switched in such a way that only the first control device 19 is switched-in to the control path, while the second control device 20 is not connected in the control path. Therefore, the drive motor 9 in this switch position is controlled exclusively by the first control device 19. The changeover element 18 is represented here as a simple mechanical switch. Alternatively, however, a changeover element 18 that is switched electronically, and that has corresponding optical or capacitive sensing for sensing the position elements 16, 17, may also be used.

Figure 2:
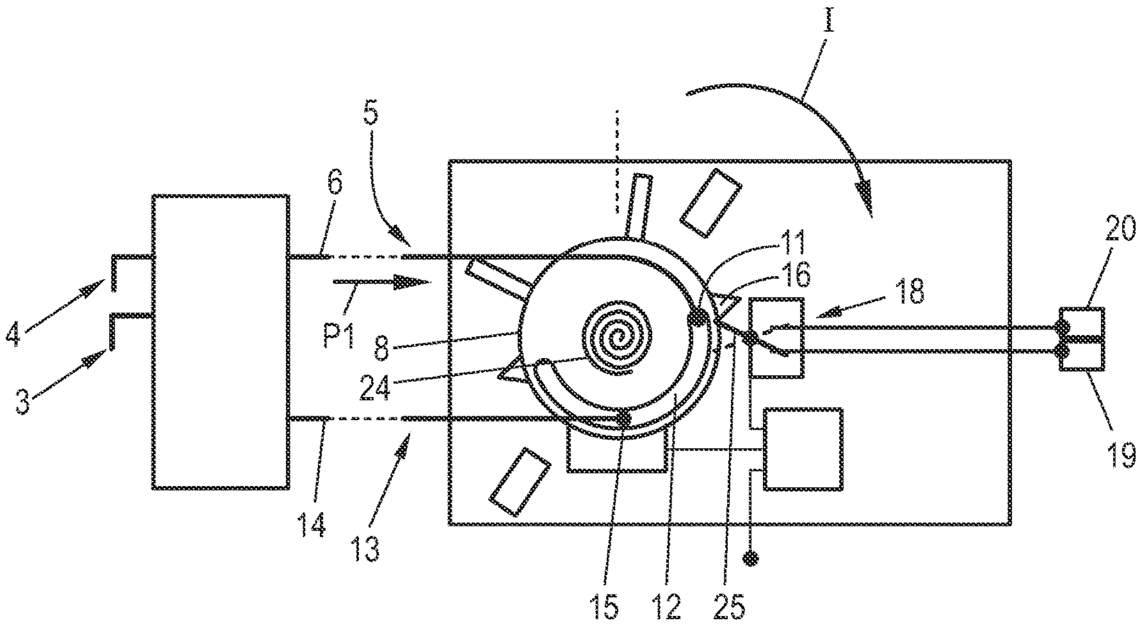

When the user wishes to open the front flap automatically, which is made possible by the locking apparatus 1, the user actuates an actuating element located in the vehicle interior, for example a pushbutton or similar, whereby the first control device 19 receives a corresponding signal that opening is required. The first control device 19 thereupon operates the drive motor 9 such that the latter rotates in a direction that causes the rotary actuator 8 to rotate in the first direction I, i.e. clockwise. This operation is shown in FIG. 2, in which it can be seen that the rotary actuator 8 is rotated out of the neutral position shown in FIG. 1. The rotary actuator 8 is provided with a spring element 24, which, in the neutral position shown in FIG. 1, does not exert any preload force upon the rotary actuator 8. However, when the rotary actuator 8 is rotated out of the neutral position, as shown in FIG. 2, the spring element 24 is extended or compressed, depending on the design, i.e. the spring element 24 generates a restoring force.

Simultaneously with the rotation of the rotary actuator 8, the Bowden cable 6 is also pulled (see arrow P1), i.e. the unlocking element 5 is actuated, since, as shown in FIG. 2, the groove 12 naturally also changes its position due to the rotation of the rotary actuator 8. Since the Bowden cable 8 is accommodated in the groove 12 by the retaining nipple 11 and is located on the base of the groove 12, the pull-cable is necessarily drawn along and pulled, thereby causing the first stroke on the double-stroke lock 2, resulting in the unlocking of the first locking element 3. The pull-shut element 13, i.e. this second Bowden cable 14, in this case remains unactuated, with its retaining nipple 15 merely moving freely in the groove 12.

Figure 3:
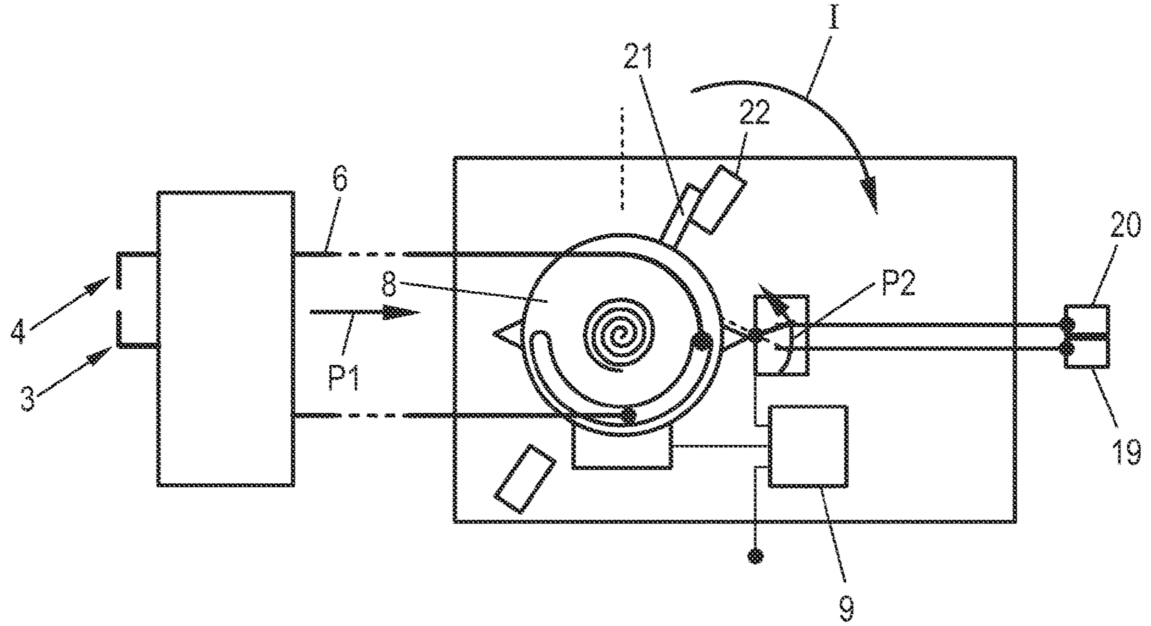

As shown in FIG. 2, due to the rotation in direction I, the first position element 16 approaches the changeover element 18. Upon further rotation of the rotary actuator 8, always controlled by the drive motor 9 and the first control device 19, the first position element 16 runs against a switching element 25 of the changeover element 18, which in this case, see arrow P2 in FIG. 3, changes over from the first control device 19 to the second control device 20, which from then on is switched into the control path, while the first control device 19 is switched out of the control path. With the changeover from the first control device 19 to the second control device 20, the stop element 21 also runs against the first stop 22, thereby delimiting the rotary movement of the rotary actuator 8. The Bowden cable 6 is now pulled to its maximum, and the first locking element 3 is definitely unlocked in this position. The first stroke is completed in the position shown in FIG. 3.

Figure 4:
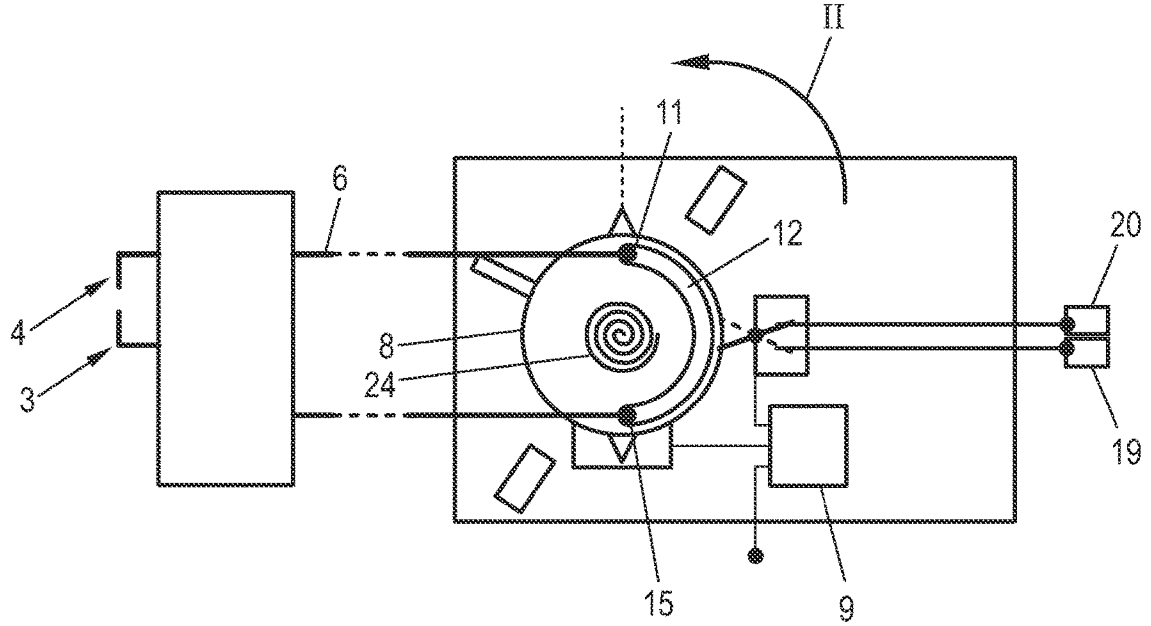

In the next step, the rotary actuator 8 reverses back to the neutral position. This backward movement is effected either by the decompressing spring element 24, with the drive motor 9 being switched off so that a reverse rotation is possible. Alternatively, it is also conceivable for the second control device 20 to be programmed in such a way that the second control device 20 operates the drive motor 9 to rotate backwards accordingly. In this case, the spring element 24 may be omitted. The restoration is effected by a rotation in the second direction II, i.e. anti-clockwise, as shown in FIG. 1. In the neutral position as shown in FIG. 4, the two retaining nipples 11, 15 are again accommodated in the initial positions in the groove 12. The original stroke of the first Bowden cable 6 is again reset.

Figure 5:
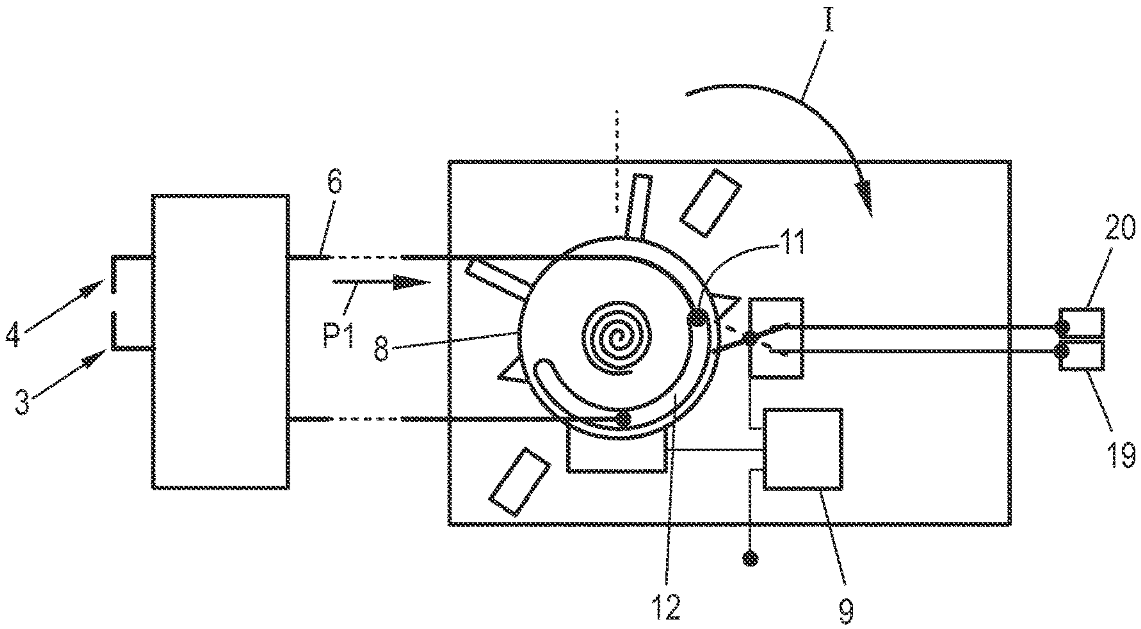

The front flap was unlocked by the first stroke and is now in the pre-latched position, which is fixed by the second locking element 4. In order to now fully unlock the front flap and also open this pre-latched position, the second control device 20 operates the drive motor again in order thereby to turn the rotary actuator 8 a second time in the first direction I, i.e. clockwise, as FIG. 5 shows. In this case the Bowden cable 6 is pulled again, since the retaining nipple 11, which bears against the base of the groove 12, is drawn along, such that the corresponding pull-cable is pulled and the second stroke is thereby effected. This movement is now controlled exclusively by the second control device, since only this control device is integrated into the control, but not the first control device 19. Therefore, for this second stroke, the control signal for the drive motor comes exclusively from the second control device 20. An inadvertent control signal transmitted from the first control device 19 therefore does not result in any activity of the locking apparatus 1, such that incorrect operation of the locking apparatus 1 is precluded.

The movement shown in FIG. 5 is again effected until the stop element 21 runs against the stop 22, the Bowden cable 6 is then again pulled to the maximum and the second stroke is fully performed and completed. The second locking element 4 is definitely unlocked, i.e. the catch hook is opened, so that the front flap can be fully swiveled open. However, the entering of the end position shown in FIG. 6 does not now result in an actuation of the changeover element 18, since the switching element 25 has already been actuated and is changed over, and so the switching element

Figure 6:
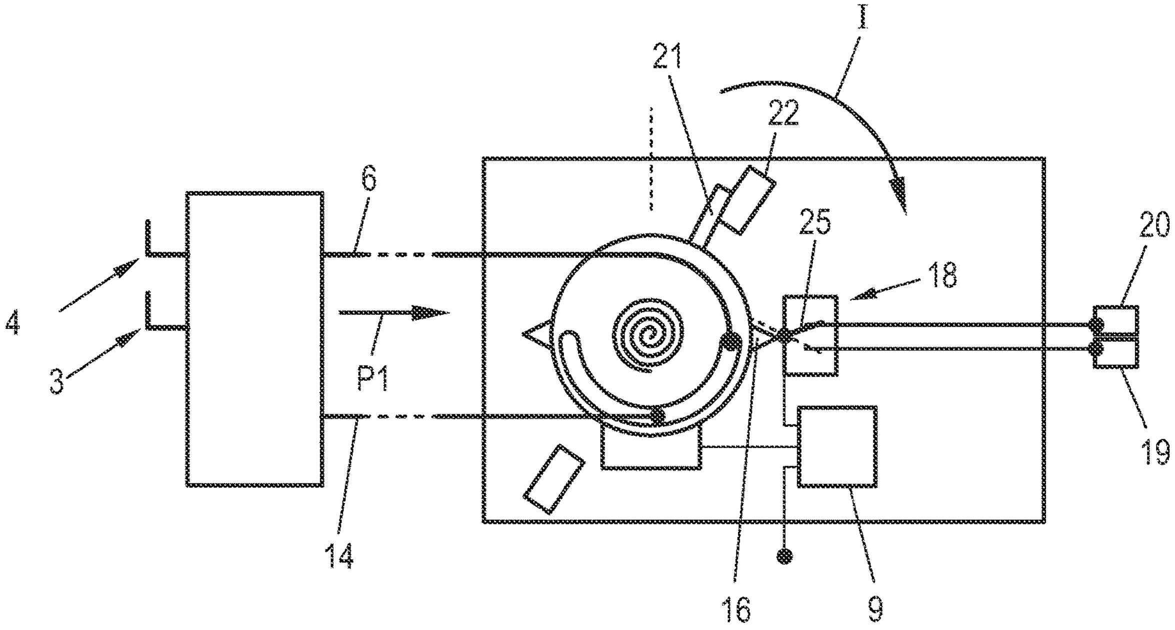

25 can no longer be actuated by the first position element 16. Consequently, there is no changeover from the second control device 20 to the first control device 19; instead, the second control device 20 remains switched into the control path. Again, the second Bowden cable 14 also remains unactuated during this second stroke, as shown in FIGS. 5 and 6.

Figure 7:
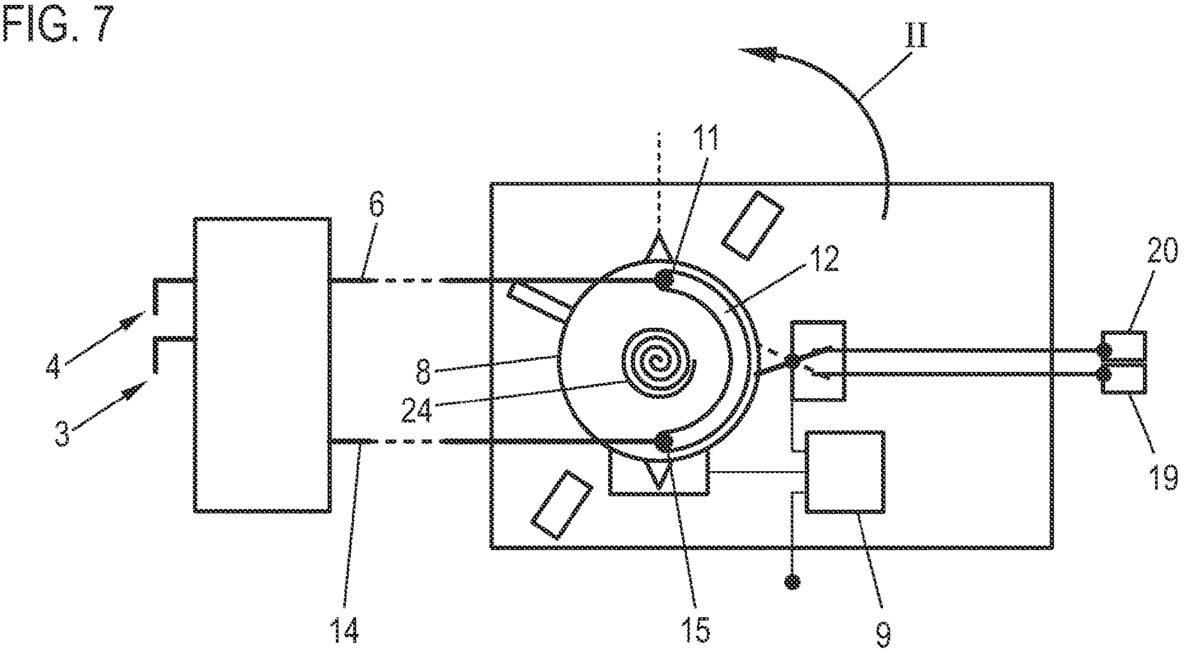

FIG. 7 again shows the operation by which the rotary actuator 8 is restored to the neutral position. This restoring operation is again effected either by the previously tensioned spring element 24, or directly by the second control device 20, which is still switched on and operates the drive motor 9 in a corresponding reversing manner. In the neutral position shown in FIG. 7, the first Bowden cable 6 is reset back and the two retaining devices 11, 15 again bear against the respective base of the groove 12.

As explained, the first control device 19 is exclusively responsible for controlling the first stroke, while the second control device 20 is exclusively responsible for controlling the second stroke. Since the front flap is now unlocked and open, the front flap is closed again in the next step, and this closing operation can also be effected automatically until the final locked position is assumed. Once this final locked position has been reached again, for the next opening process there must necessarily be a changeover to the first control device 19

Figure 8:
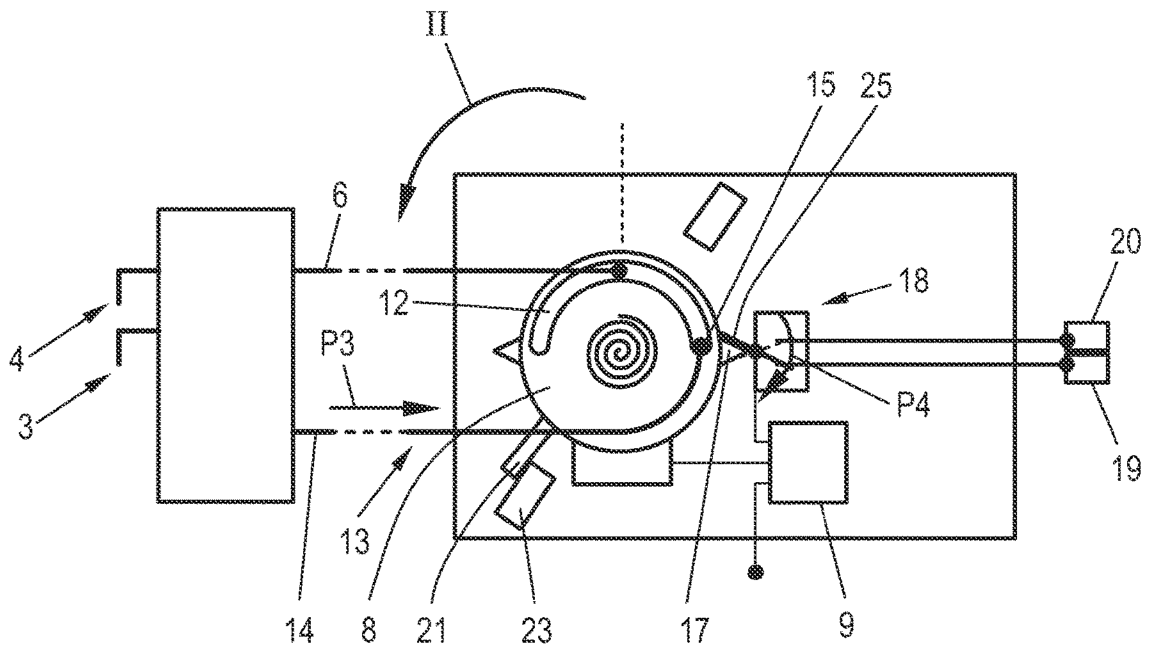

In order to effect this, after the performing of a closing operation of the front flap is sensed, for example by a suitable sensor system, the second control device 20 operates the drive motor 9 accordingly such that the drive motor 9 rotates the rotary actuator 8 in the second direction, anti-clockwise out, of the neutral position. In this situation, the front flap is already closed sufficiently far past the pre-latched position that the final closed position, in which the front flap is locked by the first locking element 3, can be assumed. This final closed position can be assumed automatically in that the front flap is actively pulled shut by the pull-shut element 13, i.e. the second Bowden cable 14. This closing operation (see arrow P3 in FIG. 8) is effected simultaneously with the movement of the rotary actuator 8 to change over from the second control device 20 to the first control device 19, as shown in FIG. 8. This is because the rotation of the rotary actuator 8 in the second direction II actuates the Bowden cable 14 on the one hand, since the groove 12 is rotated in the opposite direction, i.e. anti-clockwise, such that the retaining nipple 15 bearing against the groove base is drawn along and the Bowden cable 14 is pulled. A corresponding pull-shut mechanism of the double-stroke lock 2 is thereby actuated, i.e. this is also stroke-controlled, which pull-shut mechanism grips the front flap with a suitable pull-shut hook or similar and pulls the front flap into the locked position in which the locking element 3, for example the pawl, performs the final locking.

With this rotary movement in the second direction II, the second position element 17 simultaneously runs in the direction of the changeover element 18 and, as part of this movement, runs against the switching element 25, which actuates the changeover element 18 when the switching element 25 assumes the end position shown in FIG. 8, and switches back over from the second control device 20 to the first control device 19 (see arrow P4 in FIG. 8). From now on, only the first control device 19 is switched into the control path, while the second control device 20 is switched out of the control path again. From now on, the drive motor 9 can therefore only be controlled by the first control device 19. In this end position shown in FIG. 8, the stop element 21 bears against the second stop 23, thereby delimiting the movement in this direction of rotation.

Figure 9:
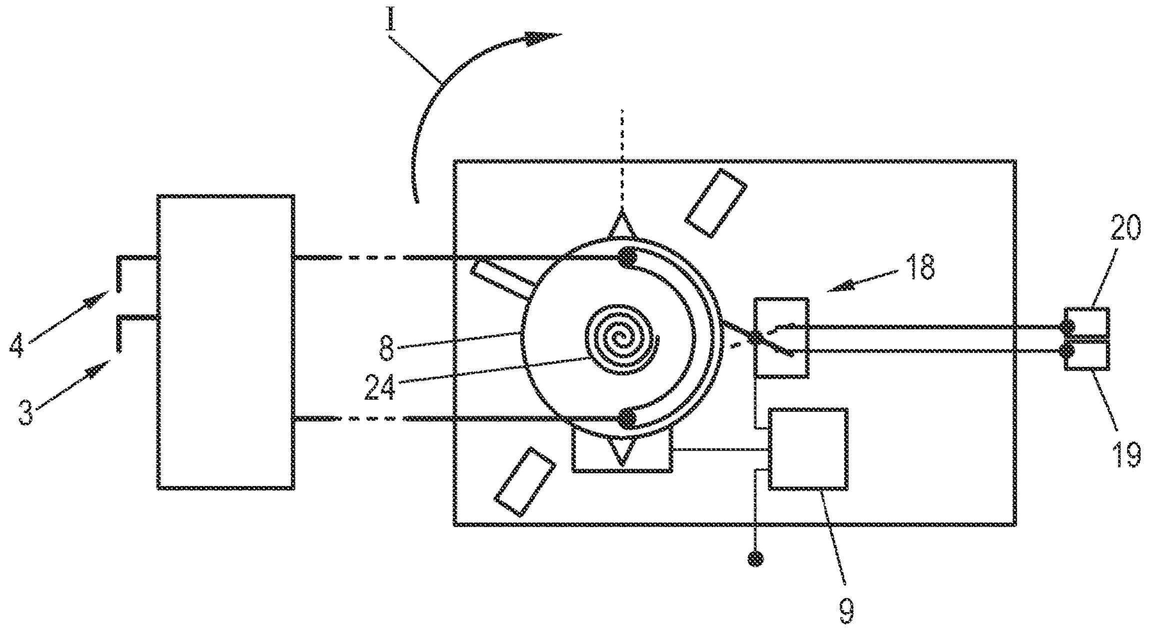

In the next step, see FIG. 9, the rotary actuator 8 is reset to the neutral position. This may again be effected either by the spring element 24, which was preloaded again during the rotation in the direction of the second direction II shown in FIG. 8, the drive motor 9 not operating in this case, such that the reverse rotation is possible. Alternatively, the restoration may also be effected by the first control device 19 and the drive motor 9 controlled by the first control device, which rotates the rotary actuator 8 in the first direction I back to the neutral position.

The schematic representations each show the actuator 7 as a rotary actuator 8. Alternatively, it is also conceivable for the actuator 7 to be realized as a linear actuator that can be moved linearly from a neutral position in a first direction and in an opposite second direction. The movement in the first direction, which in turn may be effected against the restoring force of a spring element such as a coil spring, effects the first and the second stroke for the purpose of unlocking the two locking elements 3, 4, while the movement in the opposite second direction, possibly again against a restoring element, serves to switch back from the second control device 20 to the first control device 19 (corresponding to FIG. 8) and to effect active pulling-shut by the second Bowden cable 14.

Figure 10:
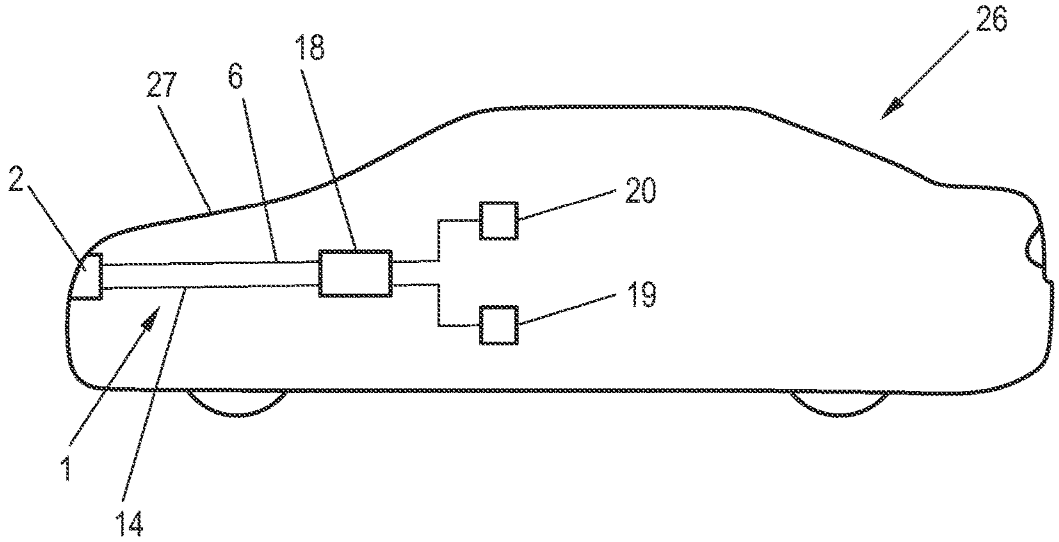
FIG. 10: shows a schematic representation of an example of a motor vehicle according to an example of the invention comprising a locking apparatus according to an example of the invention . . .

FIG. 10 shows an example of a schematic representation of a motor vehicle 26 according to an example of the invention, comprising both a front flap (such as a hood or a front trunk) 27 and a locking apparatus 1 according to an example of the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A locking apparatus for a front flap of a motor vehicle, the locking apparatus comprising:

a double-stroke lock, including a first locking element and a second locking element, to mechanically lock the front flap in a closed position and in a locked position;

an unlocking element, coupled to the double-stroke lock, to unlock the first locking element by a first stroke and the second locking element by a second stroke separate from the first stroke;

an actuator, coupled to the unlocking element, to move the unlocking element to unlock the first locking and the second locking element;

a drive motor to drive the actuator;

a first control device and a second control device to separately control the drive motor; and a changeover element to change over control of the actuator from the first control device to the second control device and vice versa based on a position of the actuator, wherein the drive motor being operable by the first control device to move the actuator to effect a first stroke, and the drive motor being operable by the second control device to move the actuator to effect a second stroke.

2. The locking apparatus according to claim 1, wherein the drive motor being controllable by the first control device to move the actuator from a neutral position, in a first direction, to effect the first stroke, as far as a first changeover position in which the changeover element to be actuated by the actuator to change over from the first control device to the second control device, whereupon the actuator to be restored to the neutral position, and the drive motor being controllable by the second control device to move the actuator from the neutral position, in the first direction, to effect the second stroke, whereupon the drive motor to be restored to the neutral position.

3. The locking apparatus according to claim 2, wherein the drive motor being controllable by the second control device to move the actuator from the neutral position, in a second direction, into a second changeover position in which the changeover element to be actuated by the actuator to change over from the second control device to the first control device, whereupon which the actuator can be restored to the neutral position.

4. The locking apparatus according to claim 2, wherein the double-stroke lock to be actuated by a pull-shut element coupled to the actuator to pull the front flap shut.

5. The locking apparatus according to claim 2, wherein the actuator is a rotary actuator to be rotated by the drive motor, or the actuator is a linear actuator to be moved linearly by the drive motor.

6. The locking apparatus according to claim 2, wherein the actuator to be returned from the first changeover position and/or the second changeover position to a neutral position by a spring element.

7. A motor vehicle, comprising:

a front flap; and a locking apparatus as claimed in claim 2.

8. The locking apparatus according to claim 3, wherein the double-stroke lock to be actuated by a pull-shut element coupled to the actuator to pull the front flap shut.

9. The locking apparatus according to claim 3, wherein the pull-shut element to be actuated during the movement of the actuator in the second direction.

10. The locking apparatus according to claim 3, wherein the actuator is a rotary actuator to be rotated by the drive motor, or the actuator is a linear actuator to be moved linearly by the drive motor.

11. The locking apparatus according to claim 1, wherein the double-stroke lock to be actuated by a pull-shut element coupled to the actuator to pull the front flap shut.

12. The locking apparatus according to claim 11, wherein the pull-shut element to be actuated during the movement of the actuator in the second direction.

13. The locking apparatus according to claim 11, wherein the unlocking element and/or the pull-shut element is/are a Bowden cable.

14. The locking apparatus according to claim 1, wherein the actuator is a rotary actuator to be rotated by the drive motor, or the actuator is a linear actuator to be moved linearly by the drive motor.

15. The locking apparatus according to claim 14, further comprising:

a first position element and a second position element, the first position element and the second position element being on the actuator and being operatively connectable to the changeover element based on a direction of movement of the actuator.

16. The locking apparatus according to claim 14, further comprising:

a stop element on the actuator;

a first stop in a first position to delimit the movement of the actuator into a first changeover position; and a second stop in a second position to delimit the movement of the actuator into a second changeover position.

17. The locking apparatus according to claim 15, wherein the first position element and the second position element are driver elements mechanically operatively connectable to the changeover element, or the first position element and the second position element are elements to be sensed optically or electromagnetically, a position of which to be sensed by a sensor of the changeover element.

18. The locking apparatus according to claim 1, wherein the actuator to be returned from a first changeover position and/or a second changeover position to a neutral position by a spring element.

19. The locking apparatus according to claim 1, wherein the actuator to be returned from a first changeover position and/or a second changeover position to a neutral position by one of the first control device and the second control device switched-in when the respective changeover position is reached, by operation of the drive motor.

20. A motor vehicle, comprising:

a front flap; and a locking apparatus as claimed in claim 1.

* * * * *